United States Patent [19]
Monjoie

[11] 4,344,899

[45] Aug. 17, 1982

[54] FILL SHEETS FOR GAS AND LIQUID CONTACT APPARATUS

[75] Inventor: Michel W. J. P. R. Monjoie, Brussels, Belgium

[73] Assignee: Hamon Sobelco, S.A., Brussels, Belgium

[21] Appl. No.: 195,254

[22] Filed: Oct. 8, 1980

[30] Foreign Application Priority Data

Oct. 26, 1979 [FR] France ............................... 79 26636

[51] Int. Cl.³ ............................................ B01D 47/02
[52] U.S. Cl. .................................... 261/112; 428/183; 428/184; 428/182; 428/596; 428/597; 261/DIG. 11
[58] Field of Search ...................... 261/112, DIG. 11; 428/184, 183, 182, 596, 597; 165/166

[56] References Cited

U.S. PATENT DOCUMENTS

| 2,793,017 | 5/1957 | Lake | 261/112 |
| 3,281,307 | 10/1966 | Moeller et al. | 428/179 |
| 3,540,702 | 11/1970 | Uyama | 261/112 |
| 3,887,664 | 6/1975 | Regehr | 261/112 |

FOREIGN PATENT DOCUMENTS

1519550 2/1970 Fed. Rep. of Germany .
7408224 8/1978 France .

Primary Examiner—George F. Lesmes
Assistant Examiner—Alexander S. Thomas
Attorney, Agent, or Firm—Kerkam, Stowell, Kondracki & Clarke

[57] ABSTRACT

A furnishing device comprises liquid carrying fill sheets which are juxtaposed and vertically corrugated and define therebetween passages for a gas, said sheets comprising in succession, in a direction parallel to the crests of the corrugations at least two regions in which the corrugations have different amplitudes, namely a region having corrugations of large amplitude and a region having corrugations of small amplitude which are interconnected by a transition region. Each sheet has at intervals along the crests of its corrugations spacer devices by means of which one sheet may be fixed to an adjacent sheet and maintained out of contact with the latter except in the region of the spacer devices.

12 Claims, 9 Drawing Figures

FILL SHEETS FOR GAS AND LIQUID CONTACT APPARATUS

TECHNICAL FIELD

The present invention relates to an installation for putting a liquid in contact with a gas and more particularly concerns fill sheets for such an installation.

BACKGROUND OF THE PRIOR ART

Installations for putting a liquid in contact with a gas usually comprise a chamber, tower or stack in which the furnishing device or fill is installed. In a known method, the latter comprises a series of juxtaposed sheets onto which is sprayed the liquid, for example water, which streams or runs along the sheets in a counter-current manner relative to the gas, for example air. These installations may be used for cooling water, acid or other solutions by means of the air of the atmosphere.

The French Certificate of Addition No. 74 08 224 discloses fill sheets having vertical corrugations which have along the edges of the corrugations deformed regions which form, on at least one of the sides of the sheets, projections or ramps extending from the edge of at least one corrugations so as to deviate the liquid. Such sheets comprise in succession, in a direction parallel to their edges, at least two regions in which the amplitude of the corrugations is different.

SUMMARY OF THE INVENTION

An object of this invention is to provide a fill sheet for a furnishing device which retains and improves the advantages of similar devices, and in particular those formed by sheets according to the French Certificate of Addition No. 74 08 224 mentioned above, that is a fill sheet which is light in weight, easy to assemble, has reduced or no maintenance, high resistance to corrosion and ice and which further more offers an improved heat exchange for a given volume of material employed and a reduction in the height of the sheets required for a given heat exchange which reduces the pumping head required to bring the liquid above the furnishing device.

The invention provides a corrugated fill sheet for a furnishing device wherein the fill sheets are juxtaposed and vertically corrugated and form therebetween passages for passage for a gas. Each sheet comprising in succession in a direction parallel to the crests of the corrugations, at least two regions in which the corrugations have different amplitudes namely a region having corrugations of large amplitude and a region having corrugations of small amplitude which are interconnected by a transition region, characterized in that each sheet has at intervals along the crests of its corrugations spacer devices by means of which the sheet may be locally fixed to an adjacent sheet and maintained out of contact with the latter except in the regions of the spacer devices.

According to a perffered embodiment of the invention, the corrugations of large amplitude have a curvilinear profile in cross section and the corrugations of small amplitude a more angular profile in cross-section.

In an extreme case, the region having corrugations of small amplitude may be planar.

According to a characteristic of the invention, the sheets have indentations on both sides.

According to another characteristic of the invention, the spacer devices comprise projecting bosses formed on the corrugations of small amplitude and flat portions formed on the side of the convexity of the corrugations of large amplitude.

According to another characteristic of the invention, the regions having corrugations of small amplitude and corrugations of large amplitude have the same length measured in a direction parallel to the crests of the corrugations.

Another object of the invention is to provide fill sheets such as those defined hereinbefore which are juxtaposed and fixed to each other, the corrugations of large amplitude and small amplitude of each sheet having the same pitch and and being in phase.

According to a characteristic of the invention, the sheets are arranged in such manner that the flat portions and the bosses of one sheet are respectively fixed to the bosses and to the flat portions of each adjacent sheet.

According to yet another characteristic of the invention, the fill sheets comprise identical sheets which are symmetrical relative to a median plane parallel to the direction of the crests of the corrugations, the sheets being disposed alternately in one direction and then 180° in the opposite direction achieved by rotation of the sheet in the plane of the sheets through 180° about an axis contained in the median plane and passing through the middle of the length of the sheet and perpendicular to the latter.

BRIEF DESCRIPTION OF THE DRAWING

Further features and advantages of the invention will be apparent from the ensuing description with reference to the accompanying drawings which are given solely by way of example and in which:

With reference to FIG. 1, there is shown a corrugated fill sheet 1 comprising alternately regions 2 in which the corrugations have a curvilinear profile and regions 3 in which the corrugations have an angular profile. The regions 2 and 3 are interconnected by intermediate regions 4 which ensure the progressive and continuous transition from one region 2 having a curvilinear or large amplitude profile to a region 3 having an angular or small amplitude profile and vice-versa. Preferably, the regions 2 and 3 have identical lengths when measured in a direction parallel to the crests of the corrugations and the sheet 1 is symmetrical relative to a median plane A—A which is orthogonal to the general plane of the sheet 1 and extends in a direction parallel to the crests of the corrugations. This symmetry permits, as will be seen hereinafter, the use of a single type of sheet for forming a furnishing device, the sheets being alternately disposed in one direction and 180° in the other direction in the furnishing device. The sheet 1 may have a single pair of regions 2 and 3, two pairs of these regions as shown in FIG. 1 or a plurality of pairs if desired, the aforementioned length of each of these regions being for example 12 cm.

As shown in FIGS. 2 and 3, the curvilinear and angular corrugations of the regions 2 and 3 respectively have the same pitch and are in phase, but the crest-to-crest amplitude of the curvilinear corrugations exceeds the crest-to-crest amplitude of the angular corrugations. As shown, the crests of the angular corrugations 3 are formed by planar surfaces 5 which are interconnected by planar surfaces 6 so that each corrugation has the shape of a trapezoid whose large base would be formed by an imaginary line interconnecting the planar crests of the two corrugations on each side of the considered corrugations. The curvilinear corrugations 2 have a profile which is approximately sinusoidal but it should be understood that the invention is not limited to the shape of curvilinear and angular corrugations described and illustrated and that any other similar curved profiles could be adopted. In particular, angular corrugations with sharp edges could be provided instead of the aforementioned planar crests 5.

Figure 2:
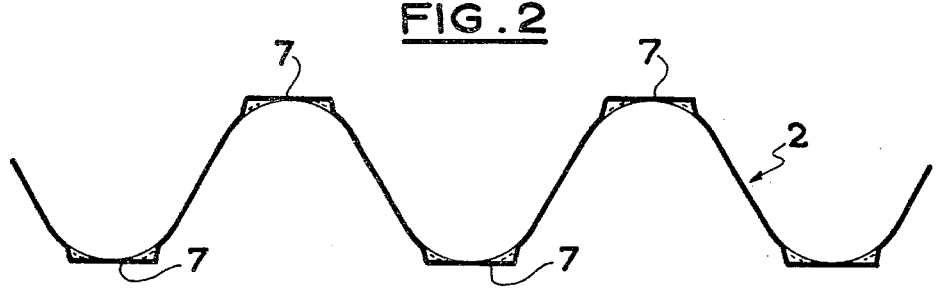
FIG. 2 is a sectional view taken on line 2—2 of FIG. 1.
Figure 3:
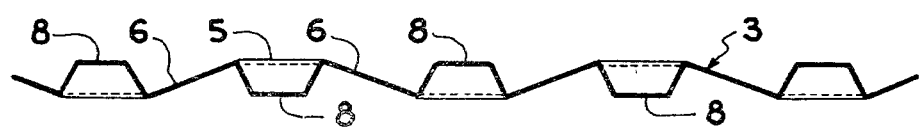
FIG. 3 is a sectional view taken on line 3—3 of FIG. 1.

The sheet 1 has at intervals along the crests of its corrugations spacer devices form by flat portions 7 and bosses 8 by means of which the sheet may be locally fixed to an identical sheet and maintained out of contact with the latter except for the region of the spacer devices as will be explained hereinafter. As can be seen in FIGS. 2 and 3, the flat portions are formed on the side of the convexity of the curvilinear corrugations 2 and the bosses 8 are formed on the side of the concavity of the angular corrugations 3. In order to permit the assembly of a plurality of sheets 1 alternately in one direction and 180° in the other in a furnishing device, the bosses and the flat portions are placed along the crests of the corrugations in such manner that one flat portion of one sheet coincides with a boss of the reversed adjacent sheet and vice-versa. The bosses 8 may have the shape of a truncated cone as illustrated or any other suitable shape, such as a truncated pyramid, and their small base has a small area of the same order of magnitude, but preferably smaller than that of the flat portions, so as to take into account manufacturing and assembling tolerances and reduce to a minimum the area of contact between two adjacent sheets. For example, the flat portion has an area of 1 sq. cm and the small base of the boss has an area of 0.25 sq. cm. Note that in the embodiment illustrated in FIG. 2, the planar surface of each flat portion is disposed in a plane which is tangent to the curvilinear corrugations 2 of the sheet 1, but, by way of a modification, this surface may be offset to one side or the other relative to this tangent plane.

Figure 4:
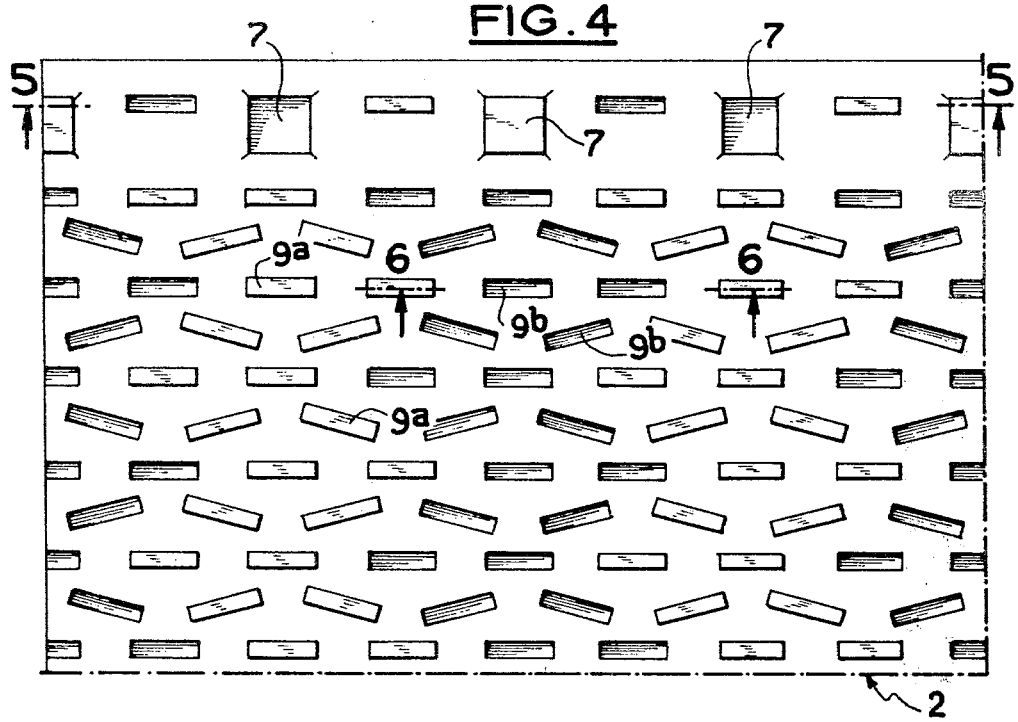
FIG. 4 is a plan view to an enlarged scale of one part of the region having curvilinear corrugations with the corrugations omitted for clarity.
Figure 5:
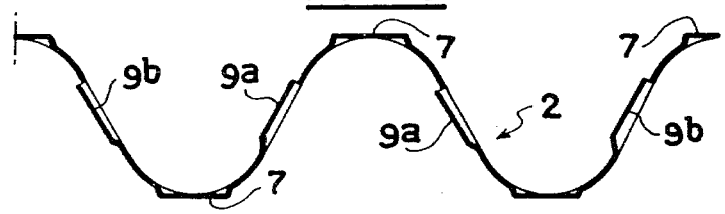
FIG. 5 is a sectional view taken on line 5—5 of FIG. 4 showing the profile of the curvilinear corrugations of the sheet of FIG. 1.
Figure 6:
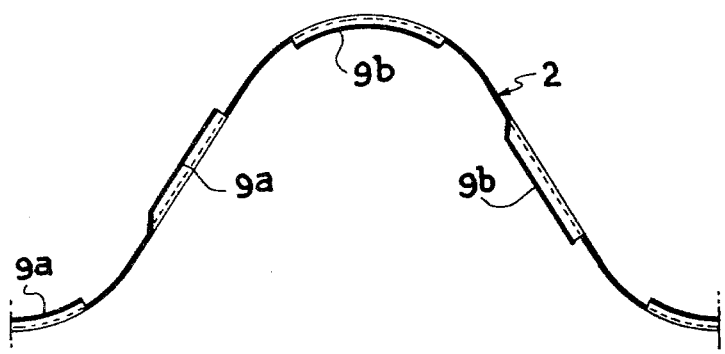
FIG. 6 is a view similar to FIG. 5 but to an enlarged scale taken one line 6—6 of FIG. 4.

With reference now to FIGS. 4 to 6, it can be seen that the sheet 1 has indentations on its opposite sides. The reliefs 9a and 9b of these indentations are arranged along rows which are parallel and orthogonal to the direction of the crests of the corrugations, the reliefs 9a devoid of cross-hatching corresponding to parts projecting toward the observer with reference to FIG. 4, whereas the cross-hatched reliefs 9b correspond to hollow parts as viewed in FIG. 4, that is parts which project from the other sides of the sheet 1 relative to the reliefs 9a. The reliefs 9a and 9b have a rectangular shape and the successive rows of reliefs alternately comprise rows in which the reliefs have their largest dimensions oriented in the direction of the row of which they are part and rows in which the reliefs have their smallest dimension oriented obliquely relative to the direction of the row of which they are part.

Figure 7:
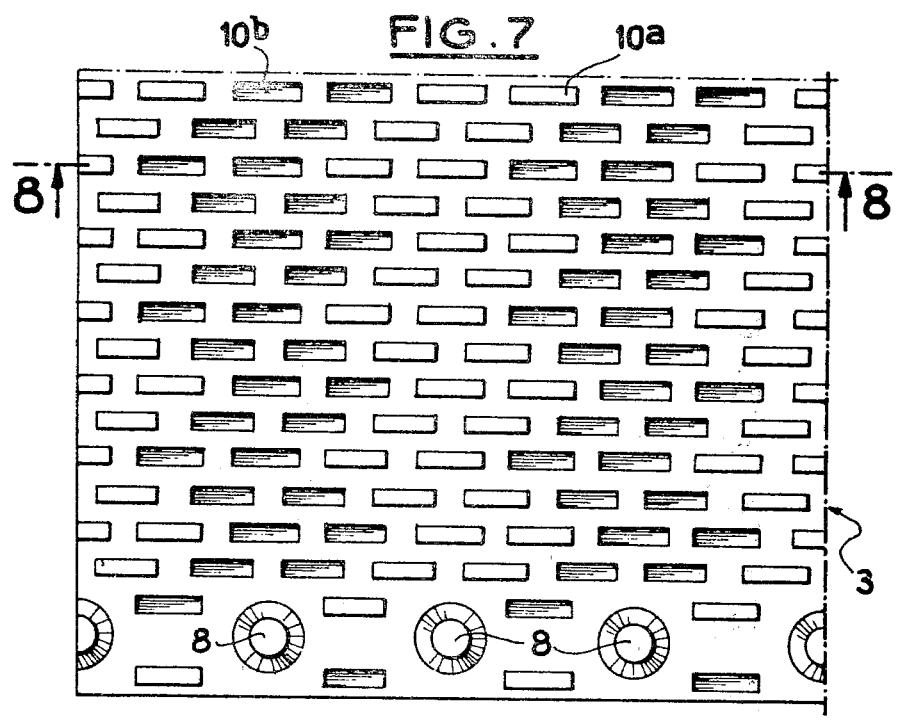
FIG. 7 is a view similar to FIG. 4 showing the indentations formed in the sheet of FIG. 1 in the region having angular corrugations, the sheet being assumed to be developed.
Figure 8:
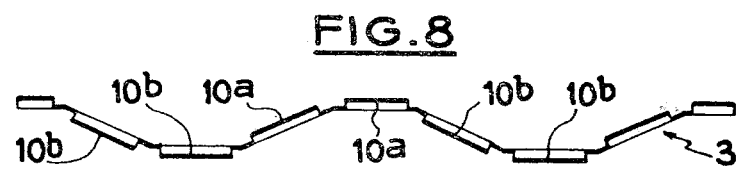
FIG. 8 is a sectional view taken on line 8—8 of FIG. 7 showing the profile of the angular corrugations.

The regions 3 having angular corrugations (FIGS. 7 and 8) also have indentations whose reliefs 10a and 10b are identical to the reliefs 9a and 9b except that they all have their largest dimension oriented in the direction of the row of which they form part.

Both in the region 2 having curvilinear corrugations and in the region 3 having angular corrugations, each row comprises alternately one pair of reliefs 9a, 10a projecting from one side of the sheet, and one pair of reliefs 9b, 10b projecting from the other side of the sheet. Lastly, preferably the transition regions 4 do not have any indentation.

In the curvilinear corrugation region 2 and the angular corrugation region 3, the indentations form on each side of the sheet a succession of bosses and hollows which have the advantage of breaking up the films of water which stream or run along each side of the sheet, strengthening the latter, and constraining the water to follow a zig-zag motion which retards its fall and consequently increases the time during which the water is in heat exchange contact with the gas which, in operation, passes between the sheets of the furnishing device.

Figure 1:
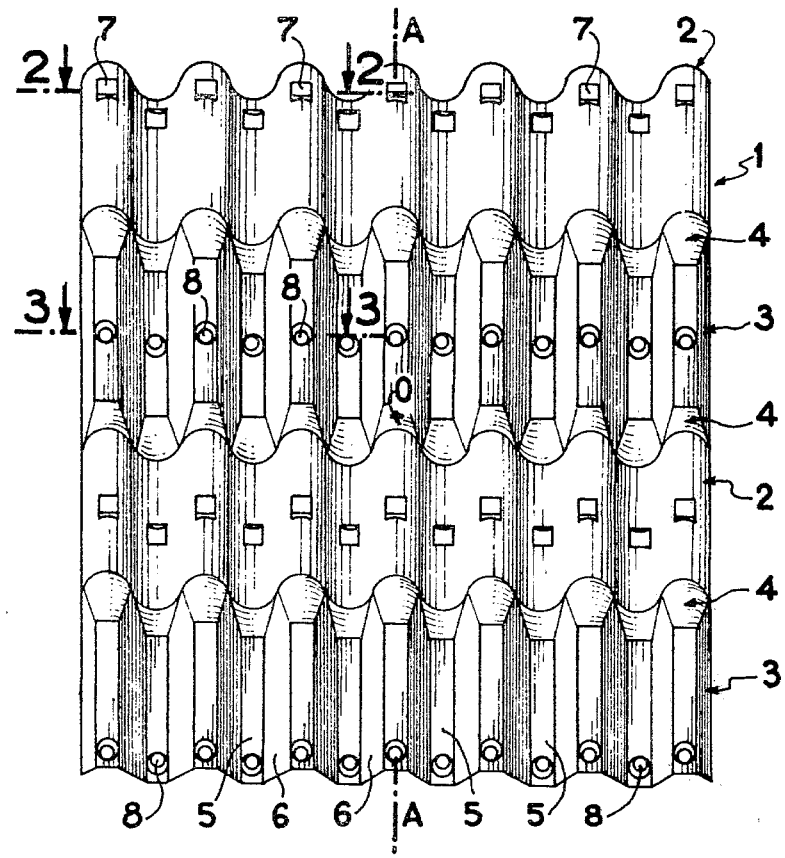
FIG. 1 is a view slightly in perspective of a fill sheet according to a preferred embodiment of the invention.
Figure 9:
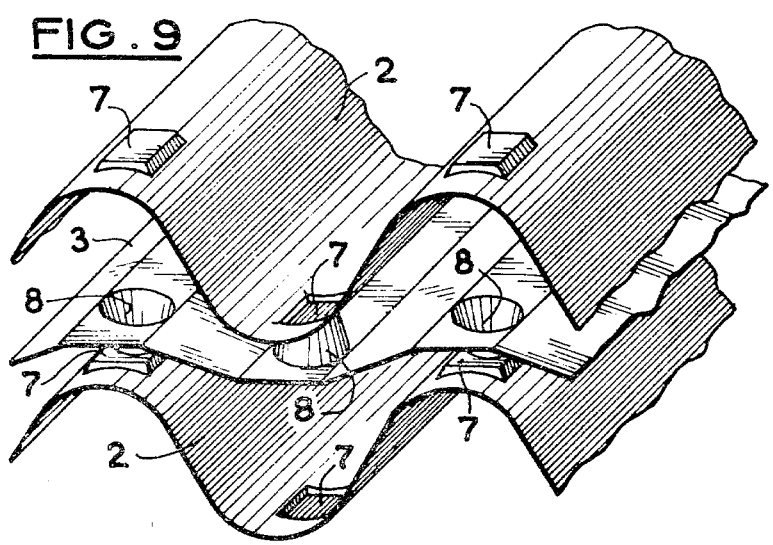
FIG. 9 is a detailed perspective view of an assembly of the sheets.

As shown in FIG. 9, in such a furnishing device, the adjacent sheets 1 are disposed in opposite directions to each other, so that one region 2 having curvilinear corrugations is always between two regions 3 having angular corrugations and that, likewise, a region 3 having angular corrugations is located between two regions 2 having curvilinear corrugations, except in respect to the end sheets of the furnishing device. As mentioned before, this arrangement is rendered possible by the fact that each sheet 1 has a median longitudinal plane of symmetry A—A and that the regions 2 and 3 have identical lengths, so that, by rotating a sheet 180° about an axis 0 (FIG. 1) contained in the aforementioned median plane and passing through the middle of the length of the sheet, the latter may be applied against an identical sheet which has not been turned, in such position that the flat portions 7 of one of the sheets coincide with the bosses or studs 8 of the other sheet and vice-versa. Consequently, the adjacent sheets are in contact only in the region of the spacer devices 7 and 8 which presents the great advantage of avoiding any continuous contact between the sheets as was the case in furnishing devices of the prior art.

Avoiding continuous contact between the adjacent sheets prevents concentration of liquid. Further, the arrangement according to the invention has the advantage of allowing the passage of the liquid from one channel, defined by a corrugation of a region 2 of a sheet and a corrugation of a region 3 of the adjacent sheet, to the following channel, which ensures an improved distribution of the liquid along the sheets.

The sheets may be assembled with each other in the region of the flat portions 7 and the bosses 8 by welding, adhesion or male and female studs provided on the flat portions 7 and the bosses 8.

By way of example, a sheet 1 may have a height of about 0.25 m to more than 2 m, and include regions 2 and 3 having a length of 12 cm as mentioned before, with a crest-to-crest amplitude of the corrugations which might be between 12 and 60 mm for the region 2 and between 0 and 40 mm for the region 3. On the other hand, the height of the bosses 8 may be of the order of 3 to 10 mm, and the length of the reliefs of the identations of the order of 1 mm. The flat portions, the bosses and the indentations, preferably form part of the sheet which may be made from plastics materials, for example by thermo-forming under a vacuum or thermo-forming by a press operation, or from metal by a press operation.

By way of a modification, the angular corrugations may have a larger amplitude than that of the curvilinear corrugations. The amplitude of the curvilinear corrugations may be in the extreme case zero so that a planar region is formed.

According to another modification, the indentations may be replaced wholly or in part by a series of apertures of circular, oblong or other shape having dimensions of the same order of amplitude as the dimensions of the reliefs of the indentations.

It must be understood that the scope of the invention is not intended to be limited to the described embodiments, and many modifications may be made therein, in particular, but not exclusively, as concerns the shape, the dimensions, and the position of the reliefs of the indentations which may be as desired.

I claim:

1. Corrugated fill sheets for a furnishing device comprising liquid fill sheets which are juxtaposed and vertically corrugated and form therebetween passages for a gas, said sheets comprising in succession, in a direction parallel to the crests of the corrugations, at least two regions in which the corrugations have different amplitudes namely a region having corrugations of large amplitude and a region having small amplitude which are interconnected by a transition region, characterized in that said sheets have at intervals along the crests of their corrugations spacer devices by means of which said sheets may be locally fixed to an adjacent sheet and maintained out of contact with the latter except in the region of said spacer devices, further said sheets have a plurality of regions having corrugations of large amplitude alternating with an equal number of regions having corrugations of small amplitude, and said regions having corrugations of small amplitude and corrugations of large amplitude have the same lengths measured in a direction parallel to the crests of the corrugations and said fill sheets further characterized in that the corrugations of large amplitude have a curvilinear profile and the corrugations of small amplitude have an angular profile.

2. Fill sheets as claimed in claim 1, characterized in that the corrugations of large amplitude have an angular profile and the amplitude of the corrugations of small amplitude approaches zero.

3. Fill sheets as claimed in any one of the claims 1 or 2 characterized in that said spacer devices comprise projecting bosses formed on the side of the concavity of said corrugations of small amplitude and flat portions formed on the side of the convexity of said corrugations of large amplitude.

4. Fill sheets as claimed in claim 1 characterized in that the crests of said corrugations of small amplitude are formed by planar surfaces carrying bosses.

5. Fill sheets as claimed in claim 4, characterized in that said bosses cooperate with flat portions of an adjacent sheet.

6. Fill sheets as claimed in claim 5 characterized in that each sheet has indentations on both its sides.

7. Fill sheets as claimed in claim 1, characterized in that each sheet includes a series of apertures of circular shape.

8. Fill sheets as claimed in claim 1, characterized in that the sheets include flat portions and bosses and said flat portions and bosses on one sheet are fixed to the bosses and flat portions respectively of adjacent sheets.

9. Fill sheets as claimed in claim 8, characterized in that it comprises identical sheets which are symmetrical relative to a median plane which is parallel to the direction of the crests of the corrugations, said sheets being disposed alternately in one direction and in the opposite direction which is achieved by rotating alternate sheets through 180° about an axis contained in a median plane and passing through the middle of the length of the sheets in a direction perpendicular to the latter.

10. Fill sheets as claimed in claim 7, characterized in that the reliefs have an elongated shape, the reliefs of each row of the region having corrugations of small amplitude having their largest dimension oriented along the direction of said row whereas said region having corrugations of small amplitude has alternately rows in which the reliefs have their largest dimension oriented along the direction of the row of which they form part and rows in which the reliefs have their largest dimension oriented obliquely relative to the direction of the row of which they form part.

11. Corrugated fill sheets for a furnishing device comprising liquid fill sheets which are juxtaposed and vertically corrugated and form therebetween passages for a gas, said sheets comprising in succession, in a direction parallel to the crests of the corrugations, at least two regions in which the corrugations have different amplitudes namely a region having corrugations of large amplitude and a region having small amplitude which are interconnected by a transition region, characterized in that said sheets have at intervals along the crests of their corrugations spacer devices by means of which said sheets may be locally fixed to an adjacent sheet and maintained out of contact with the latter except in the region of said spacer devices, further said sheets have a plurality of regions having corrugations of large amplitude alternating with an equal number of regions having corrugations of small amplitude, and said regions having corrugations of small amplitude, and corrugations of large amplitude have the same lengths measured in a direction parallel to the crests of the corrugations, said fill sheets characterized in that the crests of said corrugations of small amplitude are formed by planar surfaces carrying bosses, that said bosses cooperate with flat portions of an adjacent sheet, that each sheet has indentations on both of its sides and that the reliefs of said indentations are arranged along parallel rows which are orthogonal to said direction parallel to the crests.

12. A furnishing device for an installation for putting a liquid contact with a gas, characterized in that it comprises a series of sheets according to the claim 1, wherein said sheets are juxtaposed and fixed to each other, the corrugations of large amplitude and small amplitude of each sheet having the same pitch and being in phase.

* * * * *